United States Patent
Richter et al.

(10) Patent No.: US 9,958,538 B2
(45) Date of Patent: May 1, 2018

(54) ULTRASONIC TRANSMISSION AND RECEPTION DEVICE (71) Applicant: Robert Bosch GmbH, Stuttgart (DE)

(72) Inventors: Karl-Heinz Richter, Weil der Stadt (DE); Dirk Schmid, Simmozheim (DE); David Bartylla, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 279 days.

(21) Appl. No.: 14/895,796

(22) PCT Filed: May 22, 2014

(86) PCT No.: PCT/EP2014/060559
§ 371 (c)(1),
(2) Date: Dec. 3, 2015

(87) PCT Pub. No.: WO2014/195142
PCT Pub. Date: Dec. 11, 2014

(65) Prior Publication Data
US 2016/0103211 A1    Apr. 14, 2016

(30) Foreign Application Priority Data
Jun. 3, 2013   (DE) .................. 10 2013 210 236

(51) Int. Cl.
*G01S 7/00* (2006.01)
*G01S 7/526* (2006.01)
(Continued)

(52) U.S. Cl.
CPC .............. *G01S 7/526* (2013.01); *G01S 7/523* (2013.01); *G01S 15/931* (2013.01)

(58) Field of Classification Search
None
See application file for complete search history.

(56) References Cited

U.S. PATENT DOCUMENTS 2,572,668 A * 10/1951 Russell ..................... G01S 1/72
                                                                  342/198
2,642,562 A *  6/1953 Russell ..................... G01S 1/02
                                                                  367/903

(Continued)

FOREIGN PATENT DOCUMENTS

CN           2046221 U    10/1989
CN       101103283 A     1/2008
(Continued)

OTHER PUBLICATIONS

International Search Report for PCT/EP2014/060559, dated Aug. 19, 2014.

*Primary Examiner* — Hovhannes Baghdasaryan
(74) *Attorney, Agent, or Firm* — Norton Rose Fulbright US LLP; Gerard Messina (57) ABSTRACT

An ultrasonic transmission and reception device is described. This includes a transmission circuit for generating a transmission signal at its transmission outputs and, an ultrasonic transducer, which is suited for converting electrical signals into sound signals and sound signals into electrical signals, a transformer, the primary side of which is connected to the transmission outputs and of the transmission circuit and the secondary side of which is connected to the ultrasonic transducer, and a reception circuit for processing a received signal present at its reception input. The ultrasonic transmission and reception device is characterized in that the reception input of the reception circuit is connected to the transformer via an additional winding tap of the transformer, the additional winding tap being incorporated into the transformer in such a way that the transformed transmission signal at the reception input of the reception circuit is boosted in its voltage amplitude with a lower gain (Continued)

factor than the transformed transmission signal which excites the ultrasonic transducer.

10 Claims, 4 Drawing Sheets

(51) Int. Cl.
*G01S 15/93* (2006.01)
*G01S 7/523* (2006.01)

(56) References Cited

U.S. PATENT DOCUMENTS

| | | | | |
|---|---|---|---|---|
| 3,102,991 A * | 9/1963 | Jess | ............................ | G01S 1/72 367/87 |
| 3,176,262 A * | 3/1965 | Ehrlich | .................... | G01S 7/529 330/137 |
| 3,412,390 A * | 11/1968 | Nelkin | .................... | G01S 15/04 367/104 |
| 3,613,068 A * | 10/1971 | Thompson | ............ | H04B 5/0093 367/191 |
| 3,876,938 A * | 4/1975 | Ohta | .................... | G01S 7/52003 250/336.1 |
| 4,255,782 A * | 3/1981 | Joyce | .................... | H02M 5/293 363/159 |
| 4,701,893 A * | 10/1987 | Muller | .................. | G01S 15/101 367/137 |
| 5,347,495 A * | 9/1994 | Cherek | ................. | B06B 1/0207 333/32 |
| 6,074,346 A | 6/2000 | Oppelt | | |
| 6,674,690 B2 * | 1/2004 | Malik | ...................... | H04R 3/00 367/137 |
| 8,107,322 B2 * | 1/2012 | Reiche | .................. | B06B 1/0215 367/135 |
| 9,453,909 B2 * | 9/2016 | Burcea | .................... | G01S 7/521 |
| 2014/0043940 A1 * | 2/2014 | Niwa | .................... | G10K 11/18 367/87 |

FOREIGN PATENT DOCUMENTS

DE 4414746 11/1994
DE 10136628 2/2003

* cited by examiner

ULTRASONIC TRANSMISSION AND RECEPTION DEVICE

FIELD OF THE INVENTION

The present invention relates to an ultrasonic transmission and reception device including a transformer.

BACKGROUND INFORMATION

Ultrasonic parking systems assist drivers with everyday parking maneuvers. A fully equipped ultrasonic parking system currently includes 12 ultrasonic sensors, 6 sensors each being situated in the front and the rear. In this system, objects at a distance of a few centimeters as well as of several meters may be detected. To achieve ranges of several meters and, at the same time, maintain the proximity measuring capability, an ultrasonic transmission and reception device must optimally utilize the available energy and at the same time hold the decay time to a minimum.

In an ultrasonic transmission and reception device, a high-frequency alternating voltage signal is generated as a transmission signal by a transmission circuit. This alternating voltage signal is applied during a transmission phase to an ultrasonic transducer, in order to transmit ultrasonic waves. Since the transmission capacity and, therefore, the range of an ultrasonic transmission and reception device are substantially a function of the voltage amplitude of the transmission signal, the voltage amplitude of the transmission signal is amplified by a transformer prior to being fed into the ultrasonic transducer. In a receiving phase, reflected ultrasonic signals are received by the ultrasonic transducer and tapped there by a reception circuit.

In the process, the transmission signal with the voltage amplitude amplified by the transformer is present at the input of the reception circuit during the transmission phase. Since this reception circuit is suited for evaluating very low amplitude echo signals, its proof voltage is limited. To prevent the reception circuit from being damaged, the reception circuit is protected with a series resistor, or else the components of the reception circuit are configured with a correspondingly high proof voltage.

However, these protective measures for protecting the reception circuit entail additional costs in the manufacture of the ultrasound transmission and reception device due to expensive or additional components.

Figure 7:
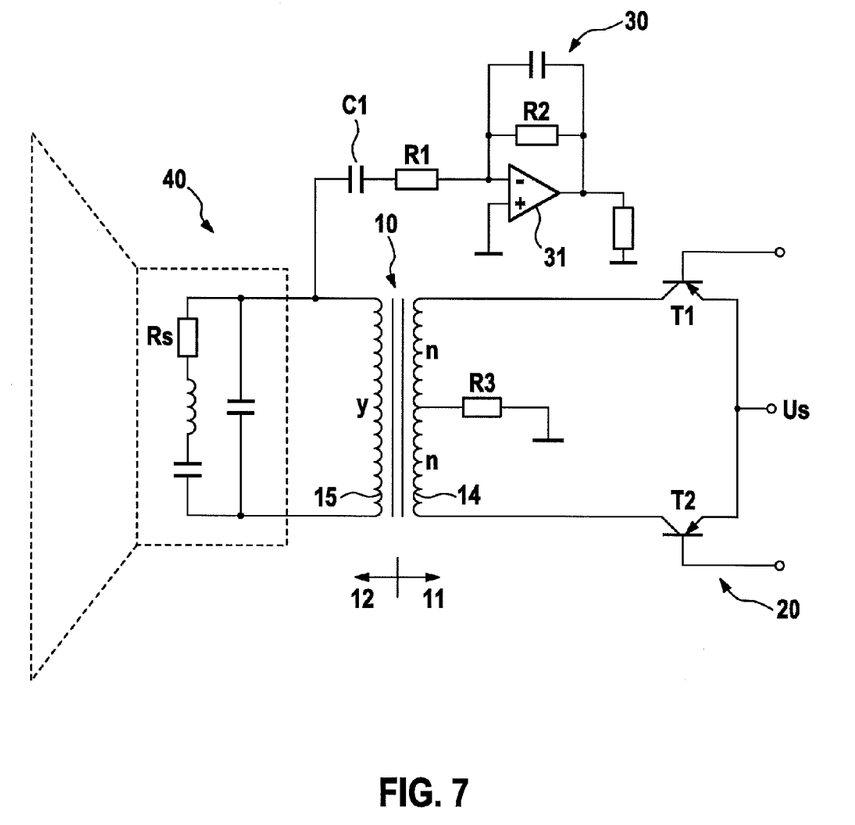
FIG. 7 shows a circuit diagram of an ultrasonic transmission and reception device according to the related art.

An ultrasonic transmission and reception device according to the related art is shown in FIG. 7. When considering the circuit design, it becomes apparent that the circuit is optimized for proximity measuring capability only. A reception circuit 30 in this case is implemented by an invertingly connecting operational amplifier 31. The reception circuit is decoupled by a capacitor C1 in relation to an ultrasonic transducer 40 and the secondary coil 15 of a transformer 10. Operational amplifier 31 in this case is amplified by a first resistor R1 connected between the inverting input of operational amplifier 31 and the input of reception circuit 30, and by a second resistor R2 connected between the output of operational amplifier 31 and its inverting input as follows: $v=-(R2/R1)$. Because of the requirement of the optimally short decay time, R1=Rs. Rs in this case is an internal resistance of ultrasonic transducer 40. The energy in the system after transmission is best dissipated via first resistor R1 and internal resistor Rs, and a high current flows into the input of operational amplifier 31 of reception circuit 30. During transmission, a current is fed into primary coil 14 of transformer 10. A current flows on the secondary side of transformer 10 in accordance with the number of windings of the transformer on primary side 11 and secondary side 12 of transformer 10. In the case of the resonance frequency of the transformer and in the transient oscillation state, the current is divided proportionately between internal resistor Rs of ultrasonic transducer 40 and of first resistor R1. Thus, half of the power output in the reception path is channeled off unnecessarily. Ultrasonic transducer 40 receives only half of the entire power output and therefore delivers only a sound pressure reduced by 3 dB.

An ultrasonic transmission and reception device is described in German Published Patent No. 10 136 628 B4.

SUMMARY

The ultrasonic transmission and reception device according to the present invention includes a transmission circuit for generating a transmission signal at its signal outputs, an ultrasonic transducer, which is suited for converting electrical signals into sound signals and sound signals into electrical signals, a transformer, the primary side of which is connected to the transmission outputs of the transmission circuit and the secondary side of which is connected to the ultrasonic transducer, and a reception circuit for processing a received signal present at its reception input. The ultrasonic transmission and reception device is characterized in that the reception input of the reception circuit is connected to the transformer via an additional winding tap of the transformer, the additional winding tap being incorporated into the transformer in such a way that the transformed transmission signal at the reception input of the reception circuit is boosted in its voltage amplitude with a lower gain factor than the transformed transmission signal which excites the ultrasonic transducer. In one device according to the present invention, the amplification of the transmission signal with respect to the reception input of the reception circuit may be selected independently of the amplification of the transmission signal with respect to the ultrasonic transducer. No additional components are required for this purpose since the reception circuit is protected from overvoltages with the aid of a modification of already existing components. In this way, the amplitude of the transformed transmission signal at the reception circuit may be selected in such a way that the components of the reception circuit remain undamaged.

The present invention also relates to a driver assistance system and a vehicle having a driver assistance system, the driver assistance system including such an ultrasonic transmission and reception device.

It is advantageous if the ultrasonic transmission and reception device is characterized in that the primary side of the transformer includes a primary coil having one first primary winding segment having at least n windings, and an additional winding segment having z windings, which may overlap with the first primary winding segment. The transmission circuit in this configuration is connected to the first primary winding segment, and excites the transformer via n windings of the first primary winding segment. The reception circuit is connected to the transformer via all z windings of the additional winding segment, and the ratio between the numbers of windings z and n is selected in such a way that a transmission signal, which is transmitted to the reception circuit directly via the transformer, does not exceed the proof voltage of the reception circuit. Such a specific embodiment is advantageous, since the gain factor for the transmission signal between the transmission circuit and the reception circuit may be freely selected. The gain factor is not limited by the number of windings of the first primary winding segment, since the number of windings z of the additional winding segment may be greater than the number of windings n of the first primary winding segment. At the same time, a particularly compact design is achieved in the case of an overlap of the additional winding segment with the first primary winding segment, since parts of the primary coil are used jointly by the additional winding segment and the first primary winding segment. It is also possible for the number of windings n of the first primary winding segment to be greater than the number of windings z of the additional winding segment.

The ultrasonic transmission and reception device is likewise advantageously characterized in that the transformer has on the primary side a primary coil including a first primary winding segment having at least n windings. The transmission circuit is connected to the first primary winding segment, and excites the transformer via n windings of the first primary winding segment. On its secondary side, the transformer includes a secondary coil having y windings, which include a partial winding segment having z windings, whereby z<y. The ultrasonic transducer is connected to the transformer via all y windings of the secondary coil, and the reception circuit is connected to the transformer via all z windings of the partial winding segment. The ratio between the numbers of windings z and n is selected in such a way that a transmission signal which is transmitted to the reception circuit directly via the transformer does not exceed the proof voltage of the reception circuit. Because the secondary coil includes the partial winding segment, a particularly compact design may be achieved.

The ultrasonic transmission and reception device is likewise advantageously characterized in that the transformer has on the primary side a primary coil including one first primary winding segment having at least n windings. The transmission circuit is connected to the first primary winding segment, and excites the transformer via n windings of the first primary winding segment. The transformer further includes a tertiary coil having z windings, the additional winding tap being an outer winding tap of the tertiary coil. The reception circuit is connected to the transformer via all z windings of the tertiary coil, and the ratio between the numbers of windings z and n is selected in such a way that a transmission signal which is transmitted to the reception circuit directly via the transformer does not exceed the proof voltage of the reception circuit. Because the additional winding tap is decoupled from the primary coil and the secondary coil of the transformer, it is possible to eliminate other decoupling elements, such as, for example, a capacitor shown in the related art. This results in a compact and cost-efficient design.

According to the present invention, one first switch may, in particular, be situated at the input of the reception circuit, through which the input side of the reception circuit may be disconnected from the transformer. Thus, the reception circuit may be disconnected from the transformer during the transmission process, and additional protection of the remaining reception circuit is thereby achieved. This is advantageous, since the proof voltage of the first switch may be higher than the proof voltage of the reception circuit. In addition, a damping of the transmission signal at the transformer is reduced, since a power drain from the reception circuit may be prevented.

In one advantageous specific embodiment, the ultrasonic transmission and reception device according to the present invention is characterized by a connectable damping resistor, which is suited to damping the oscillations of the ultrasonic transducer. A connectable damping resistor minimizes a damping of the ultrasonic transducer during the transmission phase. After the transmission phase, however, a rapid decay of the ultrasonic transducer may be achieved by a connection of the damping resistor. Thus, a short cycle is achieved between successive transmission and receiving phases. The damping resistor may be disconnected in the receiving phase, and no damping of the received signal occurs.

In another advantageous specific embodiment, the ultrasonic transmission and reception device is characterized in that the connectable damping resistor and the transmission circuit are connected to the same winding segment. In this way, it is possible to minimize the number of winding taps on the transformer and, therefore, the resultant costs as well as the space requirements.

DETAILED DESCRIPTION

Figure 1:
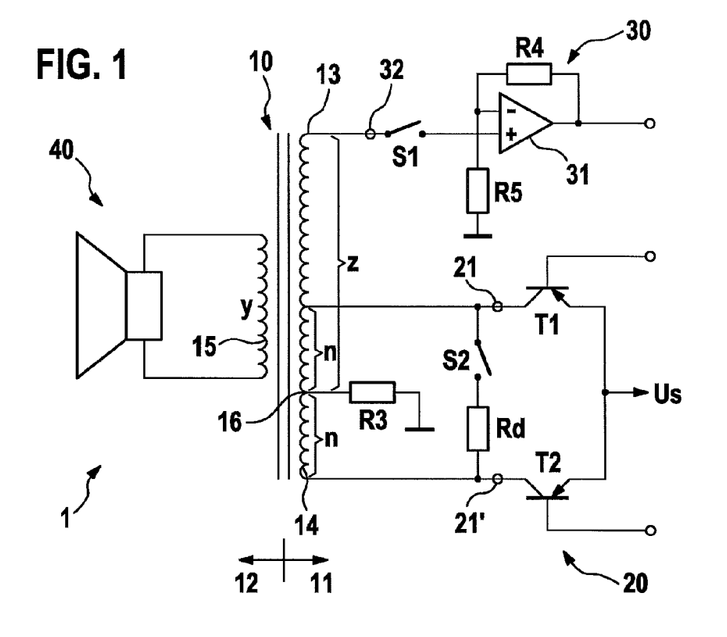
FIG. 1 shows a circuit diagram of an ultrasonic transmission and reception device according to a first specific embodiment of the present invention.

FIG. 1 shows a circuit diagram of an ultrasonic transmission and reception device 1 according to a first specific embodiment of the present invention. Transmission circuit 20 is used to generate a transmission signal at two signal outputs 21 and 21'. In this specific embodiment, transmission circuit 20 is supplied with a direct voltage Us, which is present between an input line and the ground potential of ultrasonic transmission and reception device 1. Direct voltage Us is present at the emitters of the two PNP transistors T1 and T2 of transmission circuit 20, and may be switched by these. To generate a transmission signal, the two transistors T1 and T2 are alternatingly switched. The switching of transistors T1 and T2 in this case occurs via two switching signals phase-shifted relative to one another, each of which is delivered to the base of transistors T1 and T2. The signal source for the switching signals is not shown in FIG. 1. If direct voltage Us is put through by one of transistors T1 or T2, it is present in each case at one output of the transmission circuit, the outputs of transmission circuit 20 each being formed by the collectors of transistors T1 and T2. A high-frequency reciprocal switching of transistors T1 and T2 thus generates a high-frequency transmission signal with the amplitude Us.

Outputs 20, 20' of transmission circuit 20 are connected to two different winding taps of a primary coil 14 having a total of (n+z) windings on a primary side 11 of a transformer 10. These two winding taps are separated from one another by 2n windings, one of the winding taps being located at an outer end of primary coil 14. These 2n windings describe a first primary winding segment. The first primary winding segment in this configuration includes a center winding tap 16, which is attached in the middle of the 2n windings of the first primary winding segment. This center winding tap 16 is connected to the ground potential of ultrasonic transmission and reception device 1 via a third resistor R3. By alternately exciting the two segments with n windings using the transmission signal, transformer 10 is alternately excited via n windings, respectively. Since the excitation current flows in different directions through each of the n windings of the first primary winding segment, an excitation of the transformer is achieved, which in total corresponds to an excitation via n windings with the aid of an alternating voltage having the same amplitude Us. In one alternative specific embodiment, the transmission signal may be an alternating voltage. In this case, the first primary winding segment may also merely include n windings, no central winding tap 16 being present.

FIG. 1 also shows an ultrasonic transducer 40, which is suited for converting electrical signals into sound signals and sound signals into electrical signals. Ultrasonic transducer 40 is connected to transformer 10 via all y windings of secondary coil 15 on secondary side 12 of transformer 10.

A reception circuit 30 for processing a received signal present at its reception input 32 is also shown. Reception circuit 30 is a non-inverting amplifier, which is constructed with the aid of an operational amplifier 31. The received signal in this specific embodiment is applied via a first switch S1 directly to the positive (non-inverting) input of this operating amplifier 31, the negative (inverting) input of which receives the output voltage of operational amplifier 31 via a voltage divider from a fourth resistor R4 and a fifth resistor R5, resulting in an amplification v=1+(R4/R5) of the non-inverting operational amplifier 31. The received signal is therefore amplified and is provided as an amplified received signal at the output of operational amplifier 31 and, therefore, at the output of reception circuit 30. The proof voltage of reception circuit 30 in this specific embodiment is defined by the proof voltage of first switch S1, since the latter is opened during the transmission operation. In an alternative specific embodiment without first switch S1, the proof voltage of reception circuit 30 is defined by the proof voltage of the non-inverting input of operational amplifier 31. The proof voltage in this case is the maximum voltage, which may be applied to a component without thereby damaging this component.

First switch S1, which is an electronic switch (for example, a MOS-FET), is controlled by a sequence control which is not shown. During a transmission phase, first switch S1 is open and reception circuit 30 is thus disconnected from transformer 10. During a receiving phase, first switch S1 is closed and reception circuit 30 is thus connected to transformer 10. This is advantageous, since the proof voltage of first switch S1 is higher than the proof voltage of operational amplifier 31. In addition, first switch S1, opened during the transmission phase, prevents a portion of the power of the transmission signal from being diverted via reception circuit 30, and thus failing to contribute to the transmission power of ultrasonic transducer 40.

The input of reception circuit 30 is connected to primary side 11 of transformer 10 via an additional winding tap 13 of primary coil 14, an additional winding segment having z windings being located between additional winding tap 13 and center winding tap 16. This additional winding segment overlaps with the first primary winding segment. The received signal is delivered to reception circuit 30 via this additional winding segment.

A typical winding ratio of n/y is 1/16. If, for example, a transmission signal having an amplitude of 6 V is present on primary side 11 of transformer 10, this results then in a signal amplitude on the secondary side of 96 V. Generally, a voltage of more than 40 V, generally up to 100 V, is present on the secondary side of the transformer. Thus, a high voltage is applied to ultrasonic transducer 40 and, thus, a high sound pressure is generated. A long range of ultrasonic transmission and reception device 1 is achieved. The winding ratio n/z is selected in such a way that the proof voltage of reception circuit 30 is not exceeded. In the case of an exemplary proof voltage of 12 V and a transmission signal amplitude of 6 V, a maximum winding ratio of 1/2 would have to be selected. Since the number of windings z is smaller than the number of windings y, the voltage at the input of the reception circuit is reduced. Reception circuit 30 remains undamaged, despite the high voltage at ultrasonic transducer 40. The number of windings n, x and y may be selected independently of one another and, therefore, adapted to the components used. In this case, it is preferable if the numbers of windings are whole-numbered multiples of the respective other numbers of windings.

Connected between outputs 21, 21' of transmission circuit 20, which are described by the collectors of the two transistors T1 and T2, is a damping resistor Rd, which is connectable to a second switch S2. Damping resistor Rd is connected during a damping phase by second switch S2 after the transmission phase and before the receiving phase, and is connected to transformer 10 via all 2n windings of the first primary winding segment. In this damping phase, ultrasonic transducer 40 is no longer excited, which results in a decaying of the ultrasonic diaphragm. This decaying generates an alternating induction current originating from ultrasonic transducer 40. This current is conducted to second switch S2 and damping resistor Rd via transformer 10. The induction current is dissipated by damping resistor Rd and, thus, the decay time of the ultrasonic diaphragm of ultrasonic transducer 40 is shortened. Damping resistor Rd in this case is advantageously selected when the power adjustment between the primary and the secondary side of transformer 10 is ensured. In this exemplary embodiment, the resistor is therefore selected as follows: $Rd=(4n^2/y^2)*Rs$. If most of the energy is dissipated, the reception circuit is then connected by second switch S2. In the receiving phase, second switch S2 is opened and damping resistor Rd is therefore disconnected. Thus, the sensitivity of ultrasonic transmission and reception device 1 is increased during the receiving phase.

Figure 5:
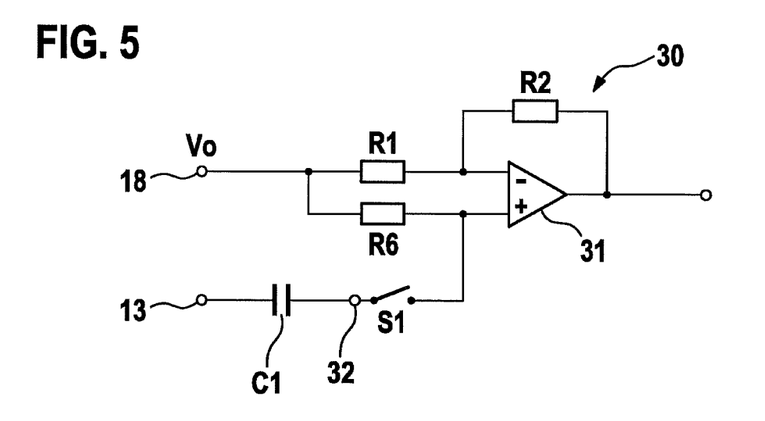
FIG. 5 shows a circuit diagram of an alternative specific embodiment of the reception circuit of the ultrasonic transmission and reception device.

In contrast to ultrasonic transmission and reception device 1 shown in FIG. 5, reception circuit 30 is disconnected by first switch S1 in such a way that the available current at best flows into ultrasonic transducer 40. This makes a significantly higher sound pressure possible. Ideally, this sound pressure is twice as high. In this case, however, the voltage of ultrasonic transducer 40 is also doubled and thus the power consumption of ultrasonic transducer 40 is increased fourfold. Given the same power consumption of ultrasonic transmission and reception device 1, an increase of 3 db in the sound pressure is realistic and, therefore, also twice the sound power. With the same sound pressure, a lower power consumption of ultrasonic transmission and reception device 1 is achieved. Optimally, the power consumption is reduced by half. In the case of the higher sound pressure, objects may be detected more reliably and at greater distances. In the case of the same sound pressure, the individual components may be designed for a lower current on primary side 11 of transformer 10 so that costs may again be saved. In this way, problems involving the power electronics may also be reduced, as well as voltage drops on the supply lines of ultrasonic transmission and reception device 1 as a result of ohmic losses. Ultrasonic transmission and reception device 1 becomes more stable as a result. Furthermore, the circuit shown in FIG. 1 also includes the advantage that resistor R1 is not attached at the input of the reception circuit. This reduces a source resistance effective for the resistance noise by the resistance value of R1. The source resistance therefore corresponds approximately to a resistance of ultrasonic transducer 40. In contrast, the source resistance in the circuit shown in FIG. 1 is approximately twice the internal resistance of ultrasonic transducer 40, since the source resistance corresponds to a parallel circuit of second resistor R2 and of internal resistor Rs and of first resistor R1 connected in series. Thus, the resistance is the same (Rs+R1)∥R2.

The configuration of first switch S1 and reception circuit 30 on primary side 11 of transformer 10 is advantageous, since connecting of high voltages on secondary side 12 of ultrasonic transducer 10, is indeed possible, but results in high component costs. For this reason, the connecting and disconnecting of reception circuit 30 in this case is enabled on primary side 11 of transformer 10. The voltage at first switch S1 is less than the voltage at ultrasonic transducer 40, since the number of windings z is smaller than the number of windings y. With sufficient proof voltage of operational amplifier 31 of reception circuit 30, it is possible to dispense with first switch S1.

Figure 2:
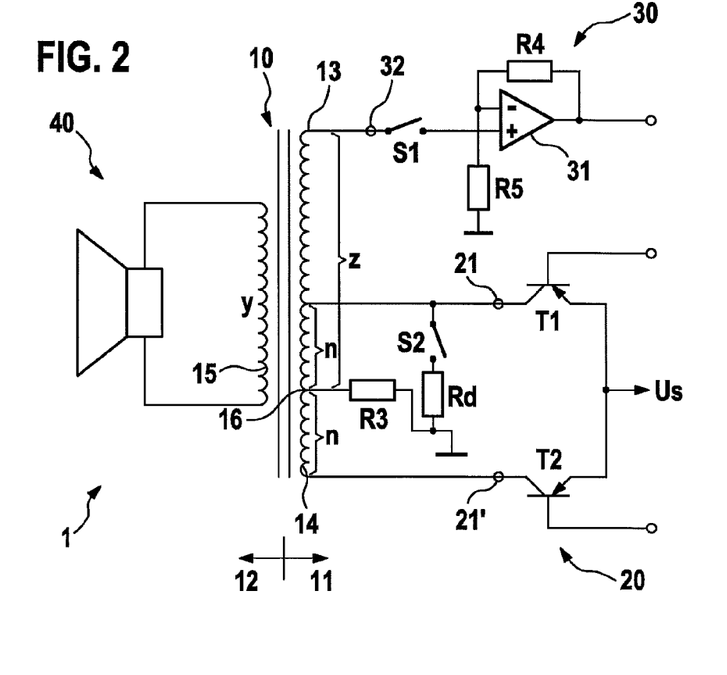
FIG. 2 shows a circuit diagram of an ultrasonic transmission and reception device according to a second specific embodiment of the present invention.

FIG. 2 shows a circuit diagram of an ultrasonic transmission and reception device 1 according to a second specific embodiment of the present invention. The second specific embodiment corresponds essentially to the first specific embodiment. However, damping resistor Rd connectable by second switch S2 is connected between the output of transmission circuit 20 described by T1 and the ground potential of ultrasonic transmission and reception device 1. Since center winding tap 16 is also connected to ground via third resistor R3, damping resistor Rd is connected via n windings to the first primary winding segment. This specific embodiment makes the advantageous utilization of resistor R3 possible. A smaller sizing of Rd is made possible, since resistors R3 and Rd are connected in series, and thus are combined for the electric circuit described by second switch S2. Damping resistor Rd in this case is advantageously selected if the power adjustment between primary and secondary side of transformer 10 is ensured. In such case, the series connection of Rd and R3 must be taken into consideration.

Figure 3:
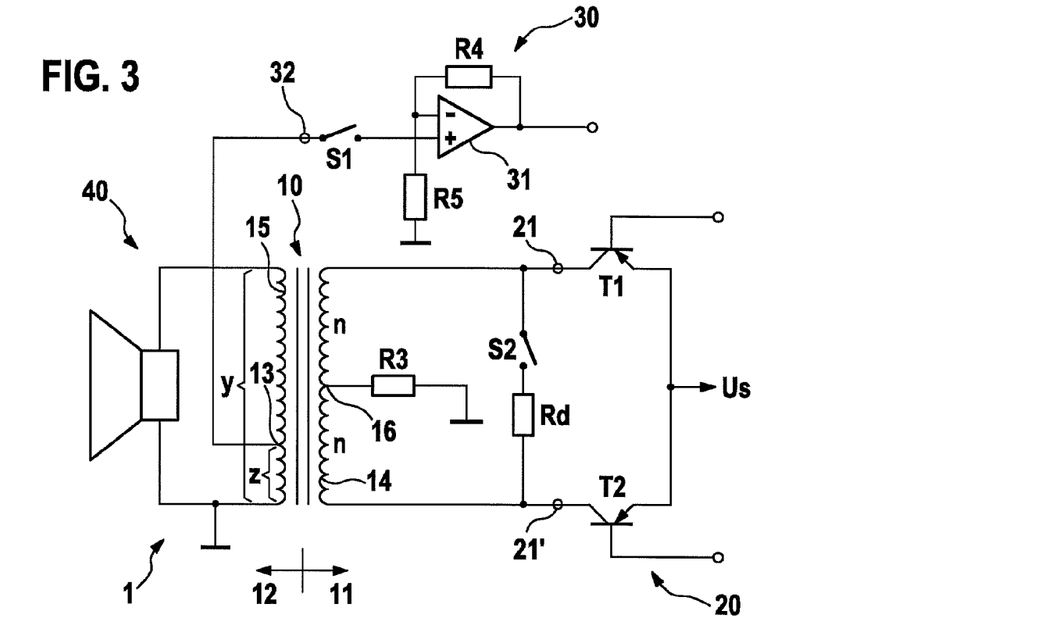
FIG. 3 shows a circuit diagram of an ultrasonic transmission and reception device according to a third specific embodiment of the present invention.

FIG. 3 shows a circuit diagram of an ultrasonic transmission and reception device 1 according to a third specific embodiment of the present invention. The third specific embodiment corresponds essentially to the first specific embodiment. However, reception circuit 30 is connected to secondary coil 15 on secondary side 12 of transformer 10. The connection takes place via an additional winding tap 13. One output of ultrasonic transducer 40, which is connected to secondary coil 15 of transformer 10, is also connected to the ground potential of ultrasonic transmission and reception device 1. A partial winding segment having z windings lies between additional winding tap 13 and an outermost winding of secondary coil 15, which lies on the side of the output of ultrasonic transducer 40, which is connected to the ground potential of ultrasonic transmission and reception device 1. This partial winding segment having z windings is part of secondary coil 15 having y windings. Thus, z<y. It is apparent that in this specific embodiment, no additional windings are required on the secondary side of transformer 10, which makes a more cost-efficient design possible. As a result of the given winding ratio z/y, the voltage at reception circuit 30 is reduced. When appropriately configuring the winding taps, the voltage ratios at ultrasonic transformer 40 and at reception circuit 30 are identical to ultrasonic transmission and reception device 1 shown in FIG. 1.

The numbers of windings n, x and y are selected as in the first specific embodiment.

Figure 4:
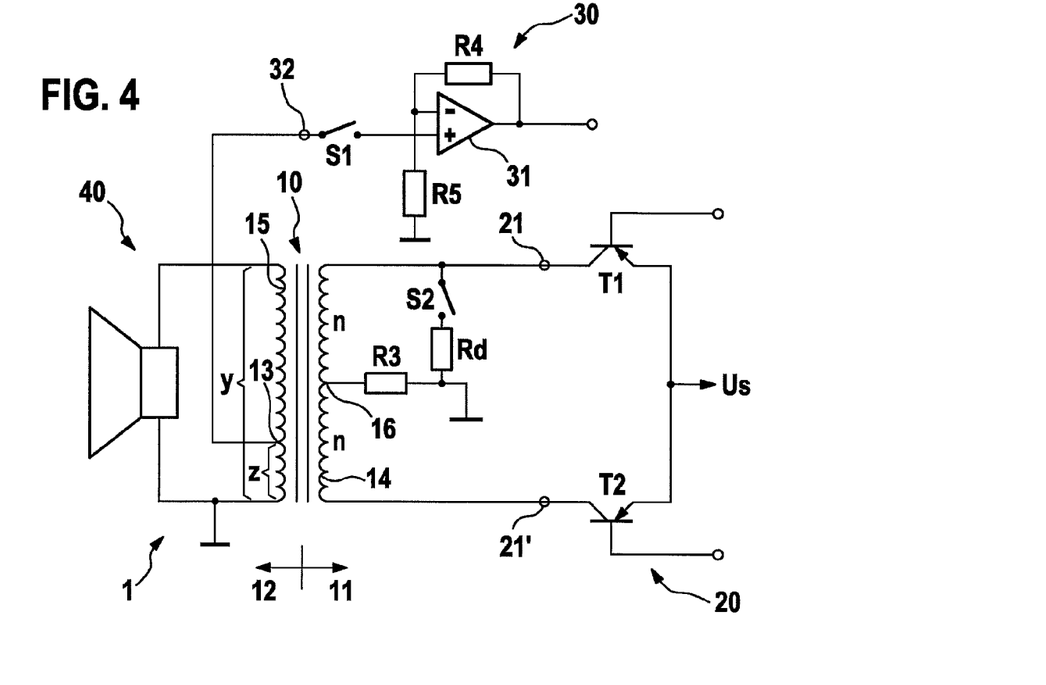
FIG. 4 shows a circuit diagram of an ultrasonic transmission and reception device according to a fourth specific embodiment of the present invention.

FIG. 4 shows a circuit diagram of an ultrasonic transmission and reception device 1 according to a fourth specific embodiment of the present invention. The fourth specific embodiment corresponds essentially to the third specific embodiment. However, damping resistor Rd connectable by second switch S2 is connected between the output of transmission circuit 20 described by T1 and the ground potential of ultrasonic transmission and reception device 1. Since the center winding tap 16 is also connected to the ground potential via third resistor R3, damping resistor Rd is connected via n windings to the first primary winding segment. This specific embodiment makes the advantageous utilization of resistor R3 possible. A smaller sizing of Rd is made possible, since resistors R3 and Rd are connected in series, and thus are combined for the electric circuit described by second switch S2. Damping resistor Rd in this case is advantageously selected if the power adjustment between the primary and the secondary side of transformer 10 is ensured. In such case, the series connection of Rd and R3 must be taken into consideration.

FIG. 5 shows an alternative specific embodiment of a reception circuit 30 of an ultrasonic transmission and reception device 1. Reception circuit 30 shown in FIG. 5 is suited to evaluating a received signal; if only positive voltages may be evaluated. For this purpose, an offset voltage is provided upstream from the amplifier. Reception circuit 30 is connected to additional winding tap 13 via a capacitor C1. Using switch S1, it is possible to disconnect reception circuit 30 from transformer 10, and a direct voltage portion is decoupled from the received signal by capacitor C1. Reception input 32 of reception circuit 30 is connected to the non-inverting input of operational amplifier 31. Reception input 32 is also connected via a sixth resistor R6 to an output 18 of a voltage source, which provides an offset voltage Vo. This offset voltage Vo preferably corresponds to half of a supply voltage VDD of operational amplifier 31 (Vo=VDD/2). The voltage of the decoupled received signal is therefore varied by Vo. Furthermore, output 18 of the voltage source is connected to the inverting input of operational amplifier 31 via resistor R1. The inverting input of operational amplifier 31 is also connected to its output via second resistor R2. Thus, operational amplifier 31 is connected as an inverting operational amplifier with an amplification v=−(R2/R1).

Figure 6:
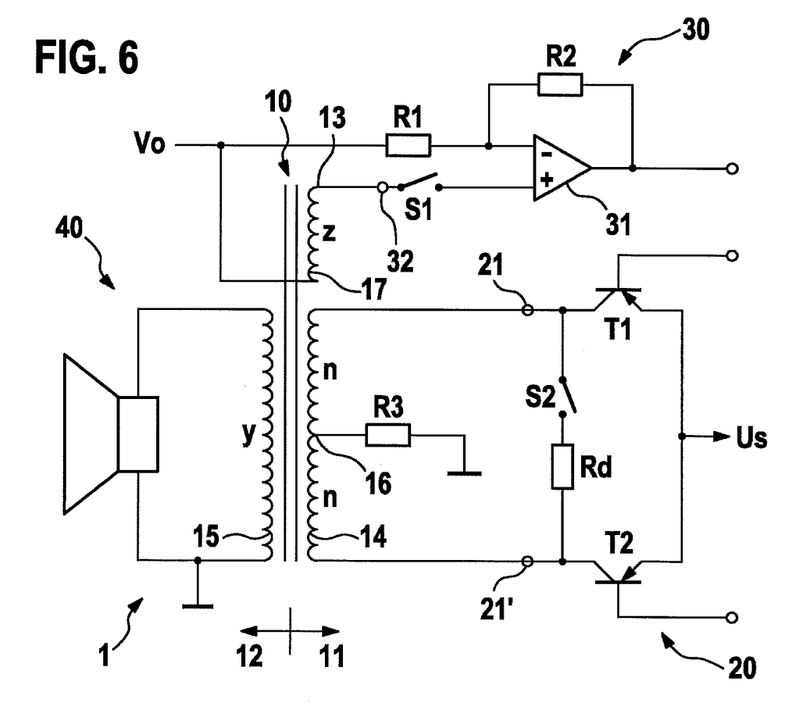
FIG. 6 shows a circuit diagram of an ultrasonic transmission and reception device according to a fifth specific embodiment of the present invention.

FIG. 6 shows a circuit diagram of an ultrasonic transmission and reception device 1 according to a fifth specific embodiment of the present invention. The fifth specific embodiment corresponds essentially to the third specific embodiment. Unlike the third specific embodiment, transformer 10 includes a tertiary coil 17 having z windings, which also includes the additional winding tap 13. Reception circuit 30 is connected to transformer 10 via all z windings of tertiary coil 17. Reception circuit 30 in this case is implemented by an invertingly connected operational amplifier 31. Amplification v of operational amplifier 31 in this case is provided by a first resistor R1 connected between the inverting input of operational amplifier 31 and the input of reception circuit 30 and a second resistor R2 connected between the output of operational amplifier 31 and its inverting input as follows: v=−(R2/R1). The non-inverting input of operational amplifier 31 is electrically connected by first switch S1 to an outer winding of tertiary coil 17 and, therefore, to additional winding tap 13. The input of reception circuit described by resistor R1 is connected to tertiary coil 17 in such a way that reception circuit 30 is connected to transformer 10 via all z windings of tertiary coil 17. In addition, an offset voltage Vo is applied to the input of reception circuit 30 described by resistor R1. This offset voltage corresponds to half of supply voltage VDD of operational amplifier (Vo=VDD/2). This specific embodiment allows reception circuit 30 to be decoupled from transmission circuit 20 and ultrasonic transducer 40 by the transformer. Capacitor C1 shown in FIG. 5, as well as resistor R6 shown in FIG. 5, are not required in this specific embodiment, since the received signal is decoupled from a direct current portion by transformer 10.

Along with the above written disclosure, reference is explicitly made to the disclosure of FIGS. 1 through 7.

What is claimed is:

1. An ultrasonic transmission and reception device, comprising:
   a transmission circuit for generating a transmission signal at signal outputs;
   an ultrasonic transducer for converting electrical signals into sound signals and sound signals into electrical signals;
   a transformer including a primary side connected to the signal outputs of the transmission circuit and a secondary side connected to the ultrasonic transducer; and
   a reception circuit for processing a received signal applied at a reception input of the reception circuit;
     wherein the reception input is connected to the transformer via an additional winding tap of the transformer, and
     wherein the additional winding tap is incorporated into the transformer so that a voltage amplitude of a transformed transmission signal at the reception input of the reception circuit is boosted with a lower gain factor than a transformed transmission signal which excites the ultrasonic transducer,
     wherein the primary side of the transformer includes a primary coil including a first primary winding segment having at least n windings,
     wherein one of the following is satisfied: (i) the secondary side of the transformer includes a secondary coil having y windings, which includes a partial winding segment having z windings, (ii) the secondary side of the transformer includes a secondary coil having y windings, which includes a partial winding segment having z windings, and (iii) the transformer includes a tertiary coil having z windings, and
     wherein a ratio between the numbers of windings z and n is such that a maximum amplitude of a transmission signal, which is transmitted directly via the transformer to the reception circuit, does not exceed a proof voltage of the reception circuit.

2. The ultrasonic transmission and reception device as recited in claim 1, wherein (i) is satisfied, and:
   the additional winding segment having z windings overlaps with the first primary winding coil segment,
   the transmission circuit is connected to the first primary winding segment, and excites the transformer via the n windings of the first primary winding segment,
   the reception circuit is connected to the transformer via all z windings of the additional winding segment.

3. The ultrasonic transmission and reception device as recited in claim 1, wherein (ii) is satisfied, and:
   the transmission circuit is connected to the first primary winding segment, and excites the transformer via the n windings of the first primary winding segment, wherein z<y,
   the ultrasonic transducer is connected to the transformer via all y windings of the secondary coil,
   the reception circuit is connected to the transformer via all z windings of the partial winding segment.

4. The ultrasonic transmission and reception device as recited in claim 1, wherein (iii) is satisfied, and:
   the transmission circuit is connected to the first primary winding segment, and excites the transformer via n windings of the first primary winding segment,
   the additional winding tap is an outer winding tap of the tertiary coil,
   the reception circuit is connected to the transformer via all z windings of the tertiary coil.

5. The ultrasonic transmission and reception device as recited in claim 1, further comprising:
   a first switch situated at the reception input of the reception circuit, with which an input side of the reception circuit is disconnectable from the transformer.

6. The ultrasonic transmission and reception device as recited in claim 1, further comprising:
   a connectable damping resistor to damp oscillations of the ultrasonic transducer.

7. The ultrasonic transmission and reception device as recited in claim 6, wherein the connectable damping resistor is interconnected with one of the secondary side and the primary side of the transformer.

8. The ultrasonic transmission and reception device as recited in claim 6, wherein the connectable damping resistor and the transmission circuit are connected to the same winding segment.

9. A driver assistance system, comprising:
   an ultrasonic transmission and reception device that includes:
     a transmission circuit for generating a transmission signal at signal outputs;
     an ultrasonic transducer for converting electrical signals into sound signals and sound signals into electrical signals;
     a transformer including a primary side connected to the signal outputs of the transmission circuit and a secondary side connected to the ultrasonic transducer; and
     a reception circuit for processing a received signal applied at a reception input of the reception circuit, wherein:
       the reception input is connected to the transformer via an additional winding tap of the transformer, and
       the additional winding tap is incorporated into the transformer so that a voltage amplitude of a transformed transmission signal at the reception input of the reception circuit is boosted with a lower gain factor than a transformed transmission signal which excites the ultrasonic transducer;
     wherein the primary side of the transformer includes a primary coil including a first primary winding segment having at least n windings,
     wherein one of the following is satisfied: (i) the secondary side of the transformer includes a secondary coil having y windings, which includes a partial winding segment having z windings, (ii) the secondary side of the transformer includes a secondary coil having y windings, which includes a partial winding segment having z windings, and (iii) the transformer includes a tertiary coil having z windings, and wherein a ratio between the numbers of windings z and n is such that a maximum amplitude of a transmission signal, which is transmitted directly via the transformer to the reception circuit, does not exceed a proof voltage of the reception circuit.

10. A vehicle, comprising:

a driver assistance system, comprising:

an ultrasonic transmission and reception device that includes:

a transmission circuit for generating a transmission signal at signal outputs;

an ultrasonic transducer for converting electrical signals into sound signals and sound signals into electrical signals;

a transformer including a primary side connected to the signal outputs of the transmission circuit and a secondary side connected to the ultrasonic transducer; and a reception circuit for processing a received signal applied at a reception input of the reception circuit, wherein:

the reception input is connected to the transformer via an additional winding tap of the transformer, and the additional winding tap is incorporated into the transformer so that a voltage amplitude of a transformed transmission signal at the reception input of the reception circuit is boosted with a lower gain factor than a transformed transmission signal which excites the ultrasonic transducer;

wherein the primary side of the transformer includes a primary coil including a first primary winding segment having at least n windings, wherein one of the following is satisfied: (i) the secondary side of the transformer includes a secondary coil having y windings, which includes a partial winding segment having z windings, (ii) the secondary side of the transformer includes a secondary coil having y windings, which includes a partial winding segment having z windings, and (iii) the transformer includes a tertiary coil having z windings, and wherein a ratio between the numbers of windings z and n is such that a maximum amplitude of a transmission signal, which is transmitted directly via the transformer to the reception circuit, does not exceed a proof voltage of the reception circuit.

* * * * *